(12) United States Patent
Shlakhetski et al.

(10) Patent No.: US 10,447,127 B2
(45) Date of Patent: Oct. 15, 2019

(54) ELECTRIC MOTOR COMPRISING SOLENOID CORES HAVING COIL SLOT

(71) Applicant: VASTECH HOLDING LTD., London (GB)

(72) Inventors: Victor Shlakhetski, Ashkelon (IL); Alexander Mostovoy, Ashkelon (IL)

(*) Notice: Subject to any disclaimer, the term of this patent is extended or adjusted under 35 U.S.C. 154(b) by 26 days.

(21) Appl. No.: 15/738,945

(22) PCT Filed: Jun. 16, 2016

(86) PCT No.: PCT/IL2016/050635
§ 371 (c)(1),
(2) Date: Dec. 21, 2017

(87) PCT Pub. No.: WO2016/207877
PCT Pub. Date: Dec. 29, 2016

(65) Prior Publication Data
US 2019/0157955 A1    May 23, 2019

(30) Foreign Application Priority Data
Jun. 25, 2015 (GB) .................................. 1511226.1

(51) Int. Cl.
*H02K 21/14* (2006.01)
*H02K 29/08* (2006.01)

(52) U.S. Cl.
CPC .......... *H02K 21/145* (2013.01); *H02K 29/08* (2013.01); *H02K 2201/12* (2013.01)

(58) Field of Classification Search
CPC ... H02K 21/145; H02K 29/08; H02K 2201/12
(Continued)

(56) References Cited

U.S. PATENT DOCUMENTS 5,379,864 A * 1/1995 Colby ................... B66B 7/044
104/284
5,798,591 A    8/1998 Lillington et al.
(Continued)

FOREIGN PATENT DOCUMENTS

CN      101277034 A     10/2008
DE      26 50 510       5/1977
(Continued)

OTHER PUBLICATIONS

International Search Report for PCT/IL2016/050635, dated Sep. 13, 2016, 6 pages.
(Continued)

*Primary Examiner* — John K Kim
(74) *Attorney, Agent, or Firm* — F. Michael Sajovec; Williams Mullen (57) ABSTRACT

The invention relates to an electric motor, comprising: (A) a rotor which comprises: (a) a co-centric shaft and disk; and (b) a plurality of permanent magnets that are equi-angularly spaced and equi-radially disposed on said disk; and, (B) a stator which comprises: (c) a plurality of solenoids that are equi-angularly spaced and equi-radially disposed, each of said solenoids having a solenoid core, which in turn has a rectangular shape in cross-section, a cavity, and a disk slot; and (d) a coil within each of said solenoids; wherein said rotor disk is positioned within said solenoids disk slots, and said permanent magnets are arranged such that they can pass through said cavities of the solenoid cores in a rotational manner, when said rotor disk is rotated.

10 Claims, 9 Drawing Sheets

(58) Field of Classification Search
USPC .......................................... 310/34, 68 B, 268
See application file for complete search history.

(56) References Cited

U.S. PATENT DOCUMENTS

| | | | |
|---|---|---|---|
| 8,183,726 B2* | 5/2012 | Rittenhouse | B60L 7/14 |
| | | | 310/68 R |
| 8,643,227 B2 | 2/2014 | Takeuchi | |
| 9,088,199 B2* | 7/2015 | Takahashi | H02K 21/145 |
| 2004/0178684 A1 | 9/2004 | Joong et al. | |
| 2006/0119215 A1* | 6/2006 | Ritz, Jr. | H02K 1/141 |
| | | | 310/268 |
| 2007/0024144 A1 | 2/2007 | Obidniak | |
| 2008/0231131 A1 | 9/2008 | Gabrys et al. | |
| 2012/0249035 A1* | 10/2012 | Ueda | B60K 6/445 |
| | | | 318/400.41 |
| 2013/0038158 A1* | 2/2013 | Takahashi | H02K 21/145 |
| | | | 310/114 |
| 2013/0113320 A1* | 5/2013 | Calley | H02K 21/145 |
| | | | 310/156.02 |
| 2014/0084715 A1* | 3/2014 | Yuan | H02K 41/03 |
| | | | 310/46 |
| 2018/0375414 A1* | 12/2018 | Mostovoy | H02K 99/20 |

FOREIGN PATENT DOCUMENTS

| | | |
|---|---|---|
| DE | 198 52 650 | 5/2000 |
| DE | 19852650 A1 | 5/2000 |
| EP | 0 422 539 | 4/1991 |
| WO | 2005/124967 | 12/2005 |
| WO | 2007022128 A2 | 2/2007 |
| WO | 2016135725 | 9/2016 |

OTHER PUBLICATIONS

Written Opinion of the International Searching Authority for PCT/IL2016/050635, dated Sep. 13, 2016, 4 pages.
International Preliminary Report on Patentability for PCT/IL2016/050635, dated Jul. 30, 2017, 10 pages.
Extended European Search Report in EP Application No. 16813841.0 dated Oct. 29, 2018.

* cited by examiner

ELECTRIC MOTOR COMPRISING SOLENOID CORES HAVING COIL SLOT

FIELD OF INVENTION

The invention relates to the field of electric motors. More specifically, the invention relates to an electric motor which includes solenoids that are placed on the stator, and permanent magnets that are placed on a disk-type rotor.

BACKGROUND OF THE INVENTION

Electric motors of the rotational type are well known, and have been widely used for many years now for converting electrical energy to mechanical energy. A typical electric motor comprises a rotor and a stator.

The rotor is the moving part of the motor, and it comprises the turning shaft which delivers the rotation to the load. The rotor usually has conductors laid into it, which carry currents that interact with the magnetic field of the stator to generate the forces that turn the shaft. In another alternative, the rotor comprises permanent magnets, while the stator holds the conductors.

The stator, in turn, is the stationary part of the motor's electromagnetic circuit, and it usually has either windings or permanent magnets. The stator core is typically made up of many thin metal sheets, called laminations. Laminations are used to reduce energy losses that would result if a solid core were used.

Electric motors are also used in a reversed functionality to convert mechanical energy to electric energy, and in such a case, the electric motor is in fact an electric generator.

However, while the electrical motor operates to convert electrical energy to mechanical energy, a parasitic magnetic flux is produced within the electrical motor, resulting in the generation of electric energy, in addition to the production of the desired mechanical energy. This parasitic electric energy in fact reduces the total mechanical energy that is obtained from the motor. The electric energy that is produced within the motor may reach up to 80% of the total energy at 3000 Rpm and 20% at 100 Rpm. All attempts to eliminate this amount of parasitic energy, which is inherent to the structure of the typical electric motor, have reached some limit, but they could not eliminate this parasitic it altogether.

U.S. Pat. No. 8,643,227 discloses a linear motor which uses a permanent magnet that moves within a solenoid.

It is an object of the present invention to provide a new structure of an electric motor in which the parasitic energy in the form of electric voltage generation, which is caused in prior art motors due to a reversed magnetic flux, is substantially eliminated.

It is still another object of the invention to provide an electrical motor which can operate at a very high rotational speed.

It is still another object of the invention to provide a safer electrical motor, which can operate with a very low voltage input.

It is still another object of the invention to provide an electrical motor having a simple and inexpensive structure.

It is still another object of the invention to provide an electrical motor having an increased efficiency compared to prior art motors.

Other objects and advantages of the invention will become apparent as the description proceeds.

SUMMARY OF THE INVENTION

The invention relates to an electric motor, comprising: (A) a rotor which comprises: (a) a co-centric shaft and disk; and (b) a plurality of permanent magnets that are equi-angularly spaced and equi-radially disposed on said disk; and, (B) a stator which comprises: (c) a plurality of solenoids that are equi-angularly spaced and equi-radially disposed, each of said solenoids having a solenoid core, which in turn has a rectangular shape in cross-section, a cavity, and a disk slot; and (d) a coil within each of said solenoids; wherein said rotor disk is positioned within said solenoids disk slots, and said permanent magnets are arranged such that they can pass through said cavities of the solenoid cores in a rotational manner, when said rotor disk is rotated.

In one embodiment of the invention the coils of the solenoids are one-turn coils.

In another embodiment of the invention, the solenoids are disposed on a stator base.

In still another embodiment of the invention, a ferromagnetic rod is disposed between any two adjacent permanent magnets of the rotor, thereby to form a close ring.

In yet another embodiment of the invention, a DC current whose direction is alternately reversed is supplied to said coils of the solenoids.

In yet another embodiment of the invention, the motor further comprises one or more sensors for sensing the position of the one or more of said permanent magnets relative to said solenoids, respectively, and for causing alteration of the direction of the DC current, respectively.

In yet another embodiment of the invention, each of said one or more sensors is a Hall-type sensor.

In yet another embodiment of the invention, said alterations of the DC current direction is caused by a controller, and wherein said alterations are timed by a signal which is received from said one or more sensors.

According to one embodiment of the invention, the poles of adjacent permanent magnets are arranged such that identical poles face one another, in an S-S, N-N, S-S . . . arrangement.

According to an embodiment of the invention, the one-turn coils of the solenoids are formed by a single conductor which passes through all the solenoids.

DETAILED DESCRIPTION OF PREFERRED EMBODIMENTS

As noted above, the typical electrical motors of the prior art suffer from a significant parasitic magnetic flux, which results in the generation of electric energy, in addition to the mechanical (rotational) energy that the motor is intended to produce. Such a generation of parasitic electrical energy results in a significant loss of energy. The present invention eliminates such loss of energy almost entirely.

Figure 1:
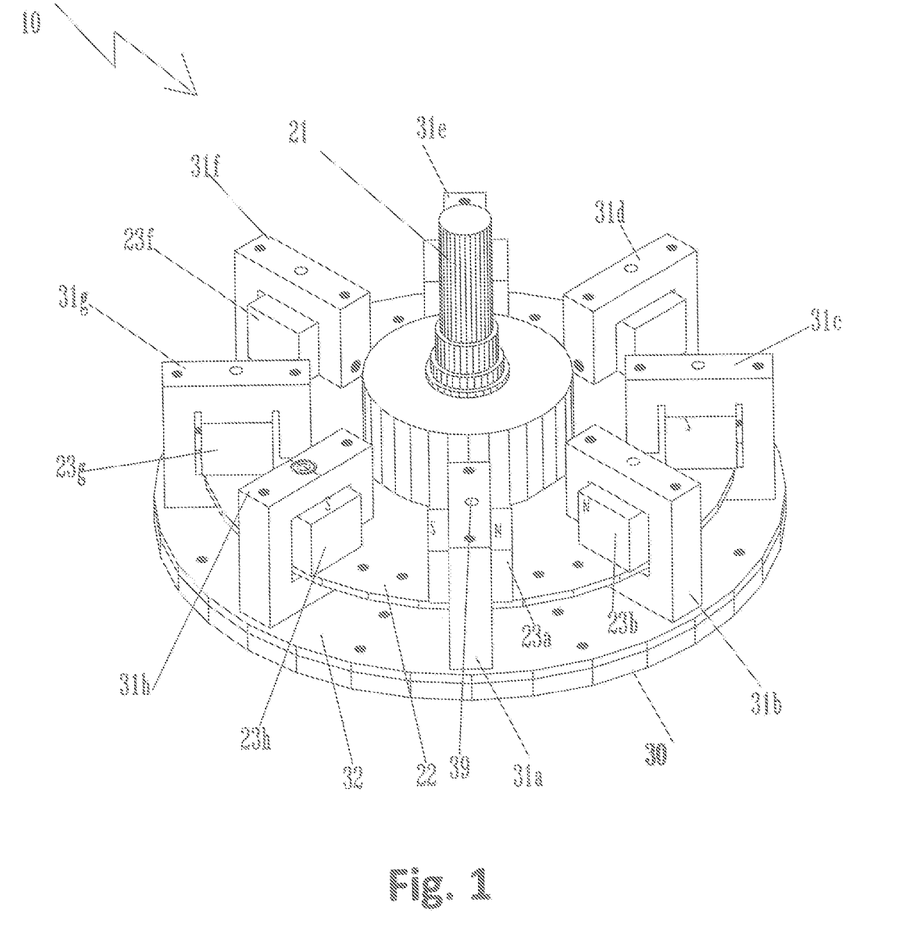
FIG. 1 shows a basic structure of an electrical motor, according to an embodiment of the invention.
Figure 2A:
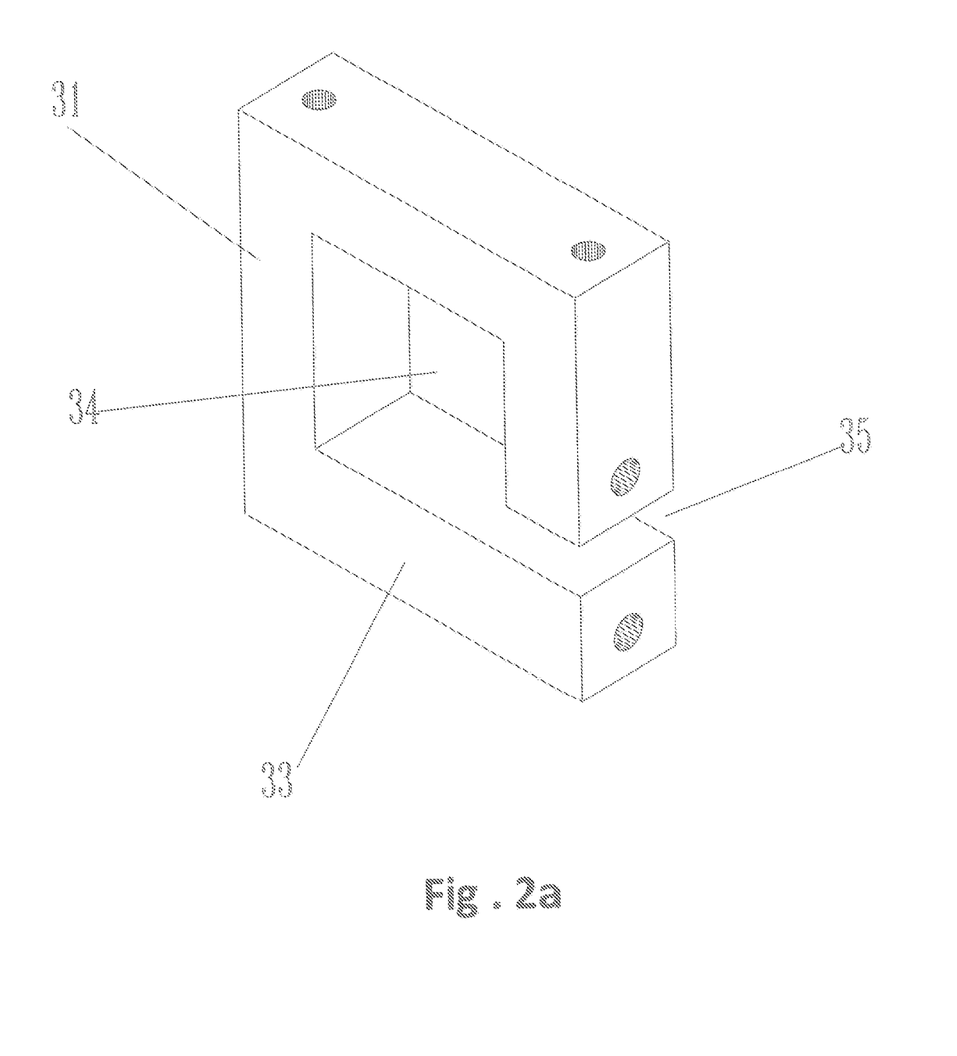
FIG. 2a shows a basic shape of each of the stator solenoids, according to an embodiment of the invention.
Figure 2B:
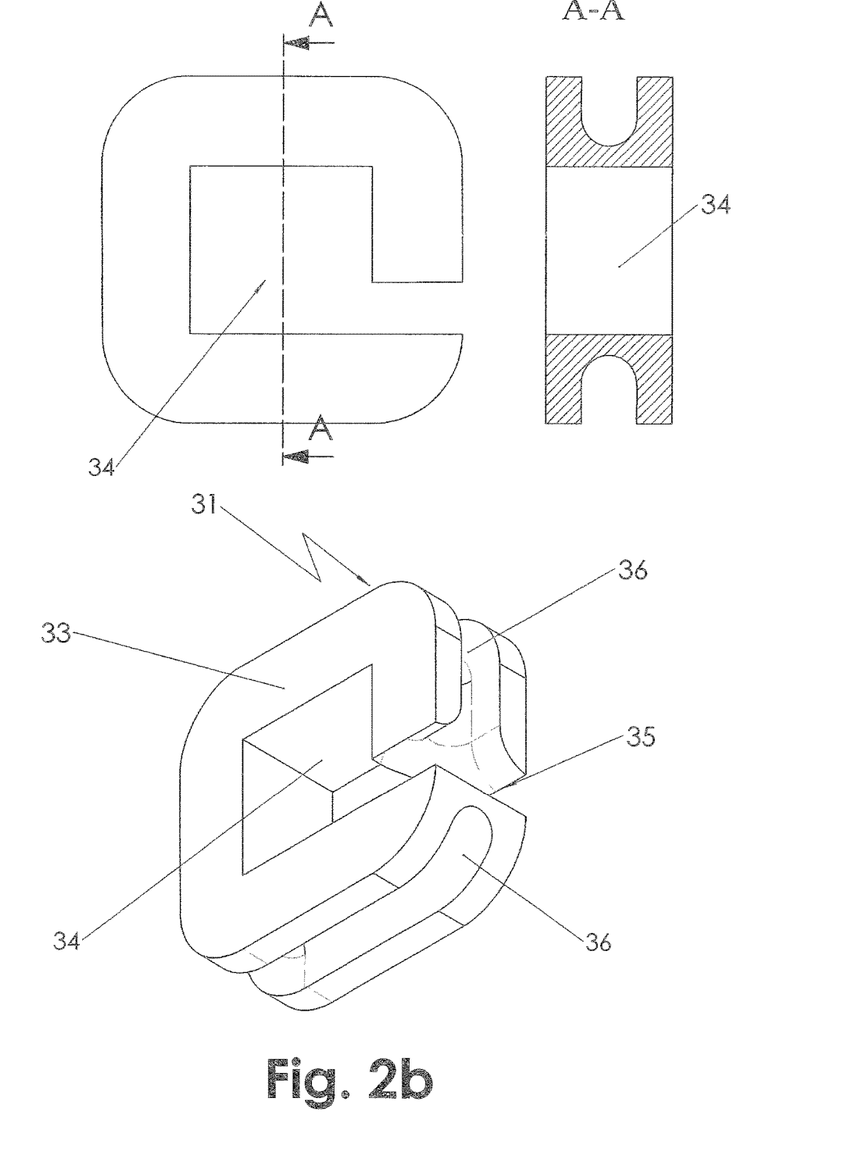
FIG. 2b shows the solenoid core of the invention in a more detailed view.
Figure 3:
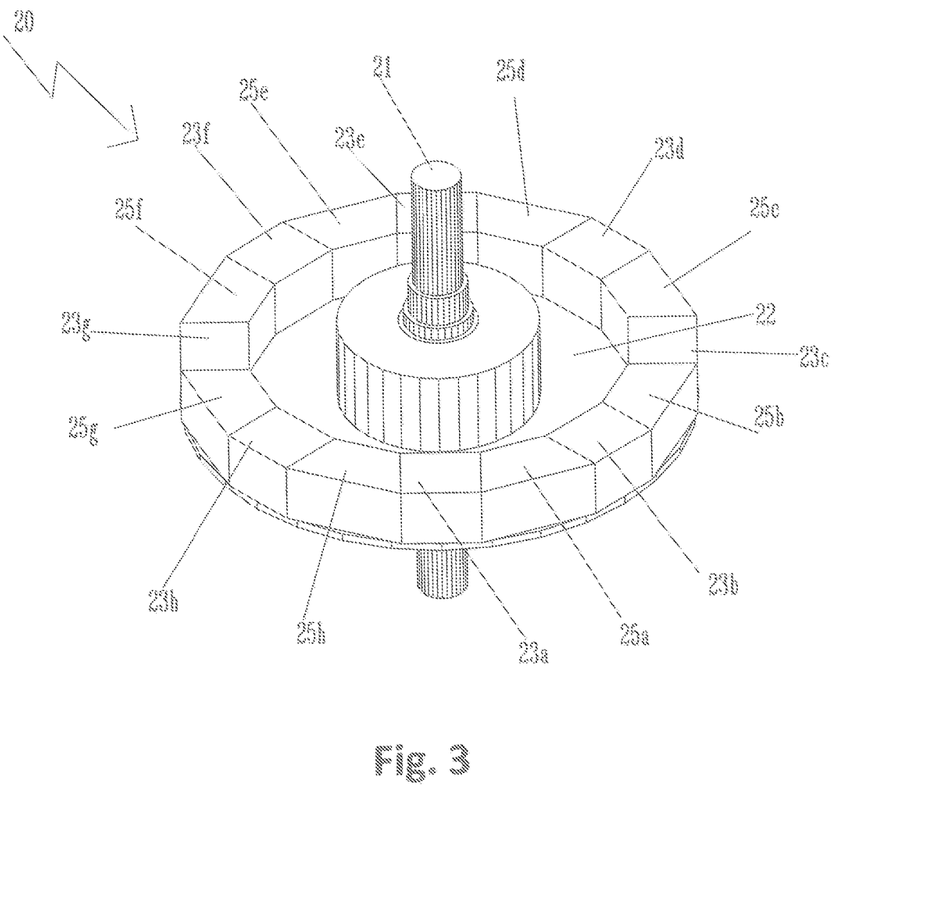
FIG. 3 shows the structure of the rotor of the invention.

FIG. 1 shows the basic structure of an electrical motor 10 according to one embodiment of the invention. The electric motor 10 comprises mainly a rotor 20 and a stator 30. The stator 30 in turn comprises a plurality of solenoids 31a-31h, that are equi-angularly spaced and equi-radially fixed to a preferably circular stator base 32. The term "equi-radially" (which is used herein for the sake of brevity), assumes a circular stator base 30. However, the stator base 30 may have any shape, and in that case all the solenoids are placed at a same distance from a central point. FIG. 2a shows the basic shape of each solenoid 31. The solenoid comprises an essentially rectangular (in cross section) solenoid core 33, which in turn has a rectangular cavity 34. Furthermore, the solenoid core 33 has a relatively narrow disk-slot 35, and a coil-slot 36 (shown in FIG. 2b). As also shown in FIG. 3, the rotor 20, in turn comprises a shaft 21, disk 22, and a plurality of permanent magnets 23a-23h that are placed on it. As shown, the plurality of permanent magnets 23 have a cross sectional shape, which is adapted to pass through the cavity 34 of the solenoid core 33. Moreover, the depth of the disk 22, on which all said permanent magnets 23 are also equi-angularly spaced and equi-radially placed, is designed to pass through each of said plurality of disk-slots 35 (see FIG. 2b) of the solenoid cores 33, respectively, in a manner as shown in FIG. 1.

As shown in FIG. 1, the permanent magnets 23 are arranged on the rotor disk 22 such that identical poles of any two adjacent magnets face one another, respectively (i.e., in an S pole facing S pole, N-N, S-S . . . arrangement). In one embodiment, and as shown in FIG. 3, a ferromagnetic (e.g., iron) rod 25 is disposed between any two adjacent magnets 23. Therefore, the set of all permanent magnets 23, together with the set of all the ferromagnetic rods 25 in between adjacent magnets, form a circular ring-type structure which passes through all the cavities 34 of the set of solenoids 31, respectively, allowing free rotation of the rotor disk 22, while the ring-type arrangement is continuously kept within said cavities of the solenoids 34.

Figure 4A:
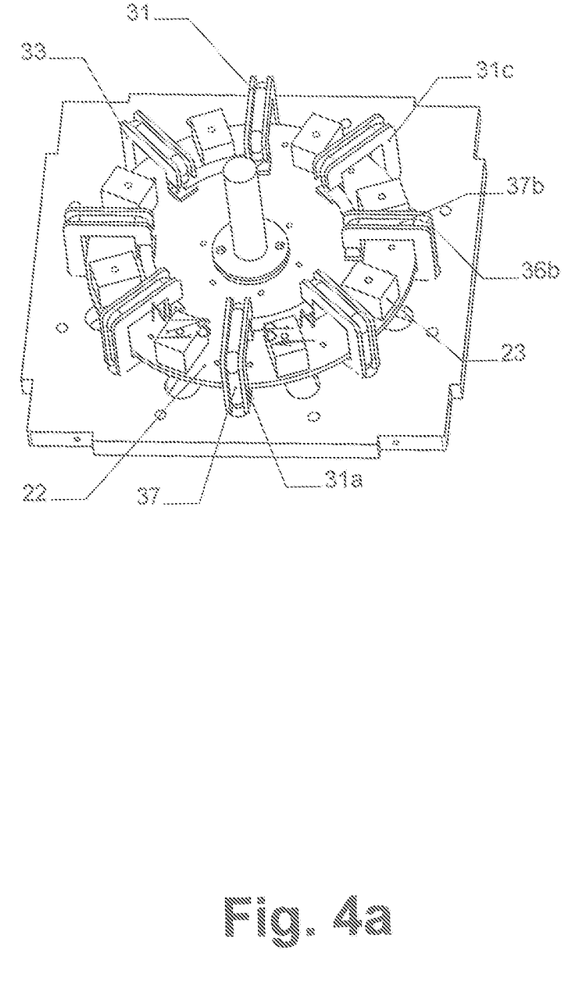
FIG. 4a illustrates in a general form the structure of the one-turn coils of the solenoids.
Figure 4B:
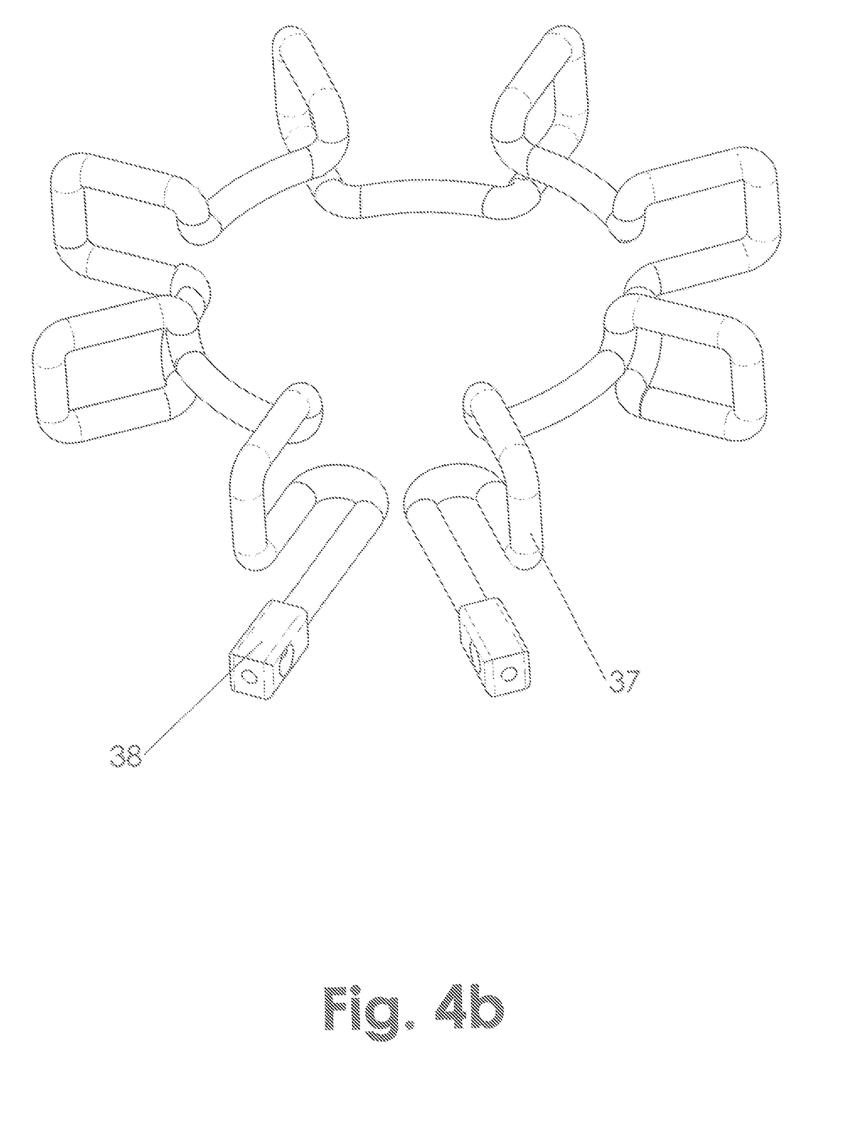
FIG. 4b shows in a general form the structure of the one-turn coils of the solenoids, while other components of the motor are removed for the sake of clarity.
Figure 4C:
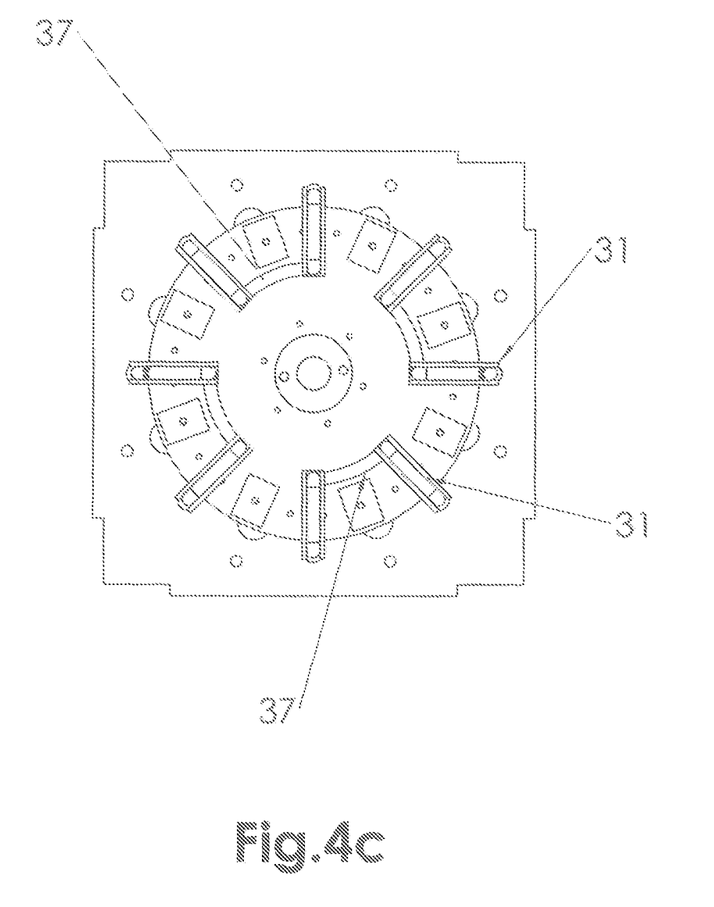
FIG. 4c is a top view showing how the single conductor passes through all the solenoids to form a plurality of single-turn solenoids.

The solenoids 31 of the stator 30 are one-turn solenoids in which a single-conductor line passes through all the plurality of solenoids in a manner as shown in FIGS. 4a, 4b, and 4c. FIG. 4a is a top view showing how the conductor 37 forms all the solenoids 31, while FIG. 4b is a similar view which shows the entire path of the single conductor 37 alone, while the rest of the motor components (such as solenoid cores 33, stator base 32, rotor disk 22, etc.) are removed from the figure for the sake of better clarity. More specifically, the route of the single conductor 37 begins within a coil-slot 36 of a core 33a of first solenoid 31a, going up along the slot, then above the core 33a in an inward radial direction, then down along the slot 36a toward the disk 22, then above the disk 22 (while not touching the disk) towards the second solenoid 31b, then up along slot 36b, then outward in the radial direction along slot 36b, then downward along the slot, then inward in a radial direction (not shown in FIG. 4a, but is illustrated in FIG. 4b), then below the disk 22 toward solenoid 31c, then radially along slot 36c, then up and radially inward along the slot 36c, etc. The route of the single conductor continues in this manner along all the plurality of solenoids, and it ends in the first solenoid 31a. Although not shown in FIGS. 4a and 4c, the route of the single conductor does not form a closed loop, but rather an open structure (as shown in FIG. 4b) in which two ends 38 of the single conductor 37 are provided next to one solenoid, for example, next to the first solenoid 31a. The operational current of the motor is supplied via said two ends of the single conductor 37. Said "open-loop" structure of the conductor 37 (as illustrated in FIG. 4b) in fact forms plurality of single-turn solenoids respectively.

Preferably, the single conductor 37 of the "open-loop" is of a Litz type conductor, which is made of a plurality of fibers. The open loop structure is fed by DC current, whose direction changes each time that a permanent magnet passes cavity 34 of a solenoid core 33 (in fact, a plurality of permanent magnets pass simultaneously through respective cavities 34 of solenoids 31). One or more Hall-type sensors 39 are positioned within one or more of the solenoids, respectively, to sense the time at which a magnet passes the cavity 34, while a respective sensing signal is conveyed to a controller (not shown), which in turn switches the direction of the DC current through the conductor each time the center of a permanent magnet passes through the cavity 34, respectively. It should be noted that the direction of the DC current has to be accurately timely altered, as otherwise the rotation of the motor will stop, or will be irregular or inefficient. The supply of the DC current to the one-turn solenoid in fact pulls the closest permanent magnet, causes rotation of the disk towards the solenoid, and upon passing the solenoid, the reversed DC current further pushes the permanent magnet away from the solenoid. In such a manner the disk 22 is rotated.

It should be noted that the single-turn coils of the solenoids result in a very low inductance. The low inductance of each of the coils allows them to switch the direction of the DC current very fast, and at a high frequency. This fact allows operation of the motor at a very high speed of rotation.

In still another alternative, in addition to using a Litz-type conductor, a laminate-type core may be used within each of the solenoids.

Figure 6:
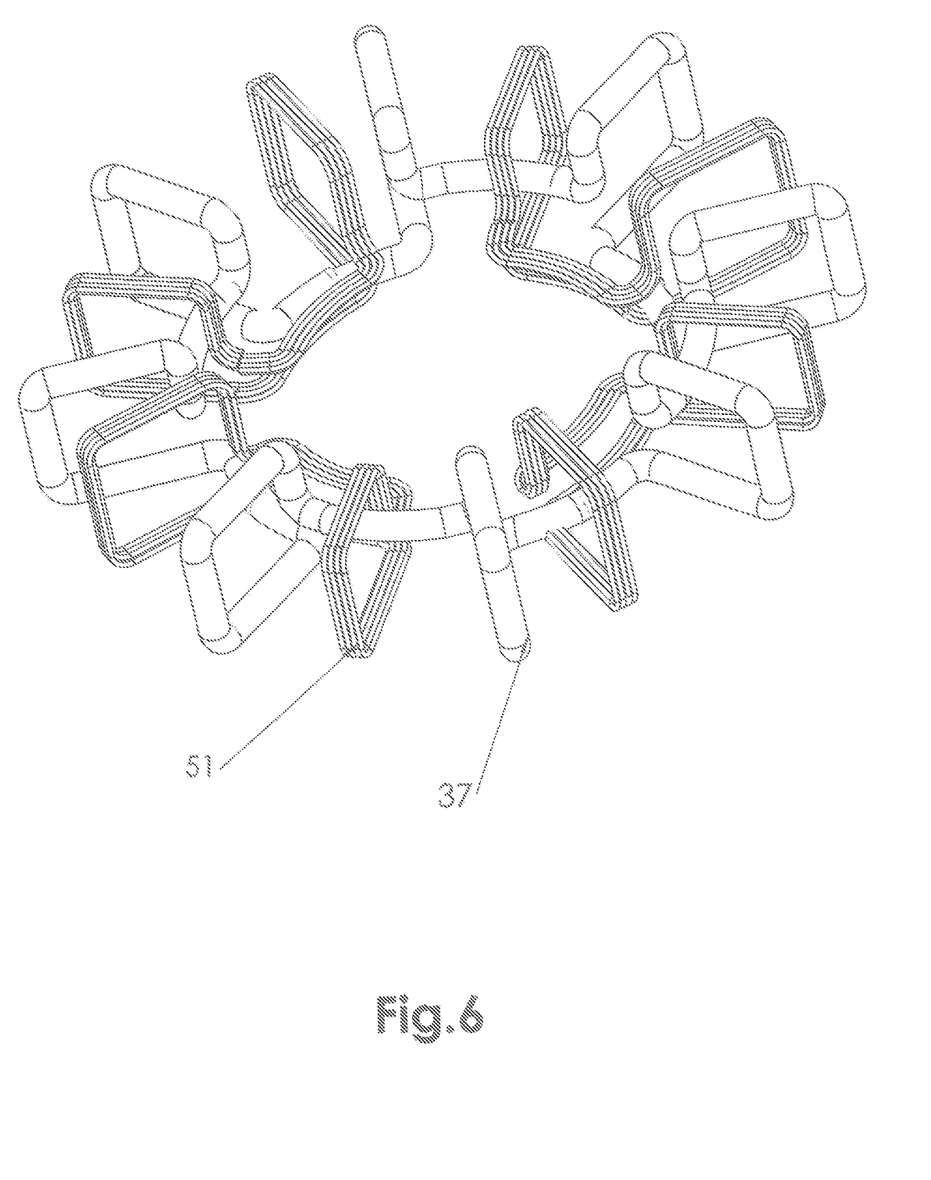
FIG. 6 shows the coils system of the motor of the invention, while the coils system further comprises a secondary coil.

FIG. 6 shows the coils system of the motor, according to still another embodiment of the invention. The coils system of FIG. 6 further comprises a secondary coil 51.

When a necessity arises to cause fast stoppage of the rotation of the motor, the current supply to the main (one-turn) coils 37 is terminated, while a DC current is supplied to the secondary coils 51. In contrast to the main (one-turn coils) that are made of the single conductor 37, the secondary coils may include plurality of turns.

It has been found that the use of a ferromagnetic rod between any two permanent magnets at the rotor disk results in an extremely low generation of parasitic voltage, and this in turn leads to a significant improvement in the efficiency of the motor compared to prior art motors.

Example

Figure 5:
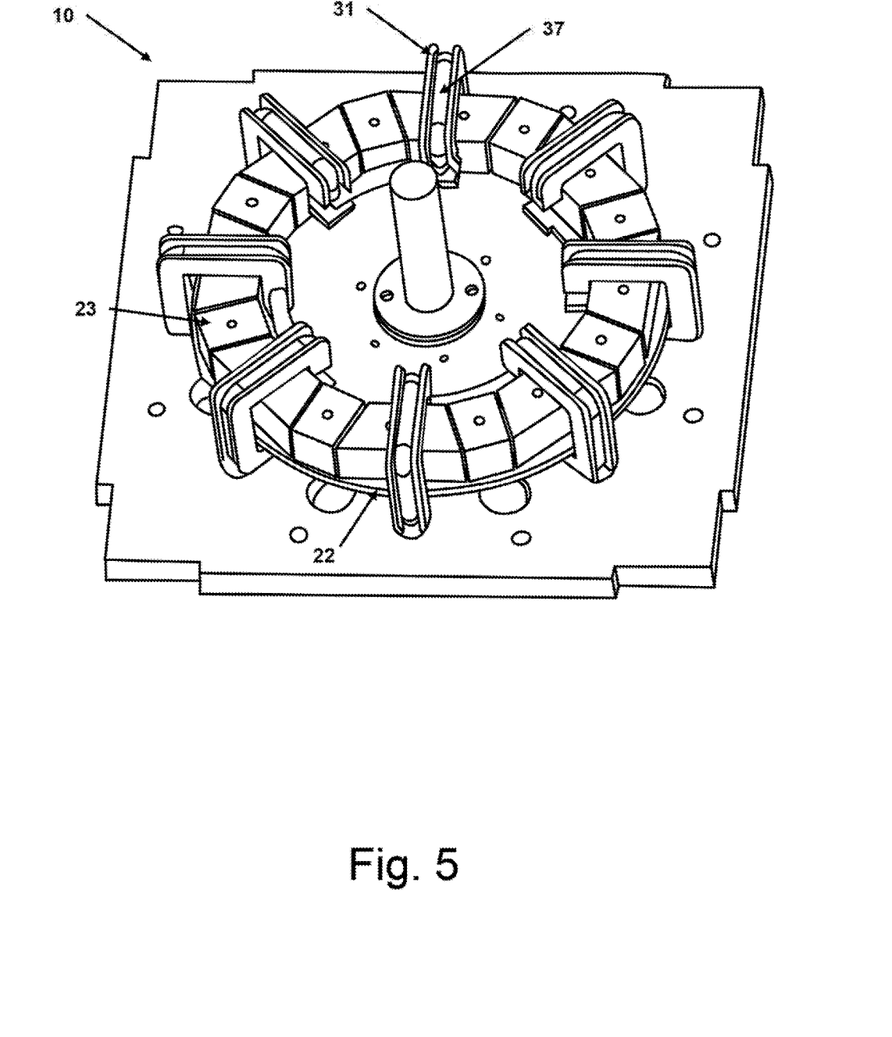
FIG. 5 shows an exemplary prototype of the motor of the invention.

FIG. 5 shows a prototype of the motor which was built according to the present invention. It was found that the motor of the invention can operate with a very low voltage supply, and high current. In this example, the prototype motor rotated at a speed of 8000 revolutions per minute, with a current supply of 150 A, and input voltage of approximately 2-5V. It has also been found that the parasitic voltage generation in the motor of the invention is extremely low, in the order of 20 mV. A torque 14 Nm per 100 Amps was measured.

While some embodiments of the invention have been described by way of illustration, it will be apparent that the invention can be carried into practice with many modifications, variations and adaptations, and with the use of numerous equivalents or alternative solutions that are within the scope of persons skilled in the art, without departing from the spirit of the invention or exceeding the scope of the claims.

The invention claimed is:

1. An electric motor comprising:
   (A) a rotor which comprises:
      a) a co-centric shaft and disk; and
      b) a plurality of permanent magnets that are equi-angularly spaced and equi-radially disposed on a top surface of said disk; and,
   (B) a stator which comprises:
      c) a plurality of solenoids that are equi-angularly spaced and equi-radially disposed, each of said solenoids having a solenoid core, which in turn has a rectangular shape in cross-section, a cavity, and a disk slot; and
      d) a coil which is wound over a coil slot positioned at an external surface of each of said solenoid cores, and wherein said coil alternately passes between adjacent solenoid cores above and below said disk, respectively;
   wherein said rotor disk is positioned within said solenoids disk slots, and said permanent magnets are arranged such that they can pass through said cavities of the solenoid cores in a rotational manner, when said rotor disk is rotated.

2. An electric motor according to claim 1, wherein the coils of the solenoids are one-turn coils.

3. An electric motor according to claim 1, wherein the solenoids are disposed on a stator base.

4. An electric motor according to claim 1, wherein a ferromagnetic rod is disposed between any two adjacent permanent magnets of the rotor, thereby to form a close ring.

5. An electric motor according to claim 1, wherein a DC current whose direction is alternately reversed is supplied to said coils of the solenoids.

6. An electric motor according to claim 5, further comprising one or more sensors for sensing the position of the one or more of said permanent magnets relative to said solenoids, respectively, and for causing alteration of the direction of the DC current, respectively.

7. An electric motor according to claim 6, wherein each of said one or more sensors is a Hall-type sensor.

8. An electric motor according to claim 6, wherein said alterations of the DC current direction is caused by a controller, and wherein said alterations are timed by a signal which is received from said one or more sensors.

9. An electric motor according to claim 6, wherein the poles of adjacent permanent magnets are arranged such that identical poles face one another, in an S-S, N-N, S-S arrangement.

10. An electric motor according to claim 2, wherein the one-turn coils of the solenoids are formed by a single conductor which passes through all the solenoids.

* * * * *